United States Patent [19]

Smiley

[11] 4,075,439
[45] Feb. 21, 1978

[54] METHOD FOR PROVIDING TEMPORARY TELEPHONE SERVICE

[76] Inventor: Jack V. Smiley, 1307 Myra St. SW., Live Oaks, Fla. 32060

[21] Appl. No.: 759,073

[22] Filed: Jan. 13, 1977

[51] Int. Cl.² .............................................. H04B 3/46
[52] U.S. Cl. ............................ 179/175; 179/175.3 S; 174/117 F
[58] Field of Search .......... 179/175.3 S, 175, 175.1 R; 174/117 F, 117 A; 340/147 SC

[56] References Cited

U.S. PATENT DOCUMENTS

| 3,082,292 | 3/1963 | Gore | 174/117 F |
| 3,833,755 | 9/1974 | Soelberg | 174/117 F |
| 3,842,219 | 10/1974 | Anderson | 179/175 |

FOREIGN PATENT DOCUMENTS 198,739  6/1923  United Kingdom ............ 174/117 A

Primary Examiner—Douglas W. Olms
Attorney, Agent, or Firm—Duckworth, Hobby & Allen

[57] ABSTRACT

Telephone service for a subscriber served by an underground or aerial cable is reinstated (or new service is established) by providing a ribbon of a low tensile strength insulating material having a spaced pair of low tensile strength conductors therein. The ribbon is strung between the subscriber's telephone terminal and an uninterrupted connection to the central office, and in parallel with the severed cable to provide a temporary, low injury risk, above-ground conductor until repair of the cable is completed.

7 Claims, 3 Drawing Figures

METHOD FOR PROVIDING TEMPORARY TELEPHONE SERVICE

BACKGROUND OF THE INVENTION

1. Field of the Invention

The present invention relates generally to the telephone art, and in particular relates to methods for repairing telephone equipment.

2. Description of the Prior Art

In recent years it has been a common practice to avoid unsightly overhead telephone lines and utility poles, especially in residential areas, through the use of underground cables. These underground cables, while enhancing the quality of the environment, greatly increase the cost of providing telephone service to the subscriber. For example, in order to repair a severed underground cable, it is frequently necessary to utilize plows to expose the cable to be repaired.

Further, many of the state utility commissions have imposed stringent requirements on telephone companies to reinstate interrupted service or provide new service to a subscriber in a specified period of time. For example, regulations of the Public Service Commission for the State of Florida require that interrupted service be reinstated within 24 hours after notification, and new service installed in 3 days where facilities are available.

In the case of a subscriber station served by a severed underground cable or a request for a new service, it is frequently not possible to have a plow on site and the cable repaired or a new service established within the time set by such regulations. Therefore, it is often necessary for the on site repair or installation crew to string conventional, overhead telephone two-wire conductor cable across the ground between the local terminal box and the subscriber's building. This type of cable is designed to withstand extreme environmental conditions, and typically has a tensile strength on the order of 600 pounds. When laying on the ground, this type of cable poses a potential trip hazard.

United States Patents which disclosed various types of electrical conductors, including flat ribbon type conductors, include the following: U.S. Pat. Nos. 377,188 to Schefbauer; 1,620,562 to Licht; 2,128,554 to Baylis; and 2,155,060 to Phillips.

SUMMARY OF THE INVENTION

The present invention contemplates a method for reinstating telephone service between the telephone central office and a subscriber connected to the central office through a severed or damaged underground cable, including the steps of providing a low tensile strain cable of insulating material having a spaced pair of low tensile strength conductors therein, stringing the cable above the ground between the subscriber's terminal and an uninterrupted connection to the central office. The conductors are coupled at one end of the cable to the subscriber's terminal, and at the other end of the cable to the uninterrupted connection whereby the cable is in parallel with the severed underground cable and provides a low injury risk above the ground until repair of the underground cable is made.

In a preferred embodiment, the cable comprises a flat ribbon having a printed warning and an outer coloring selected to warn of the presence of the cable.

DETAILED DESCRIPTION

Figure 1:
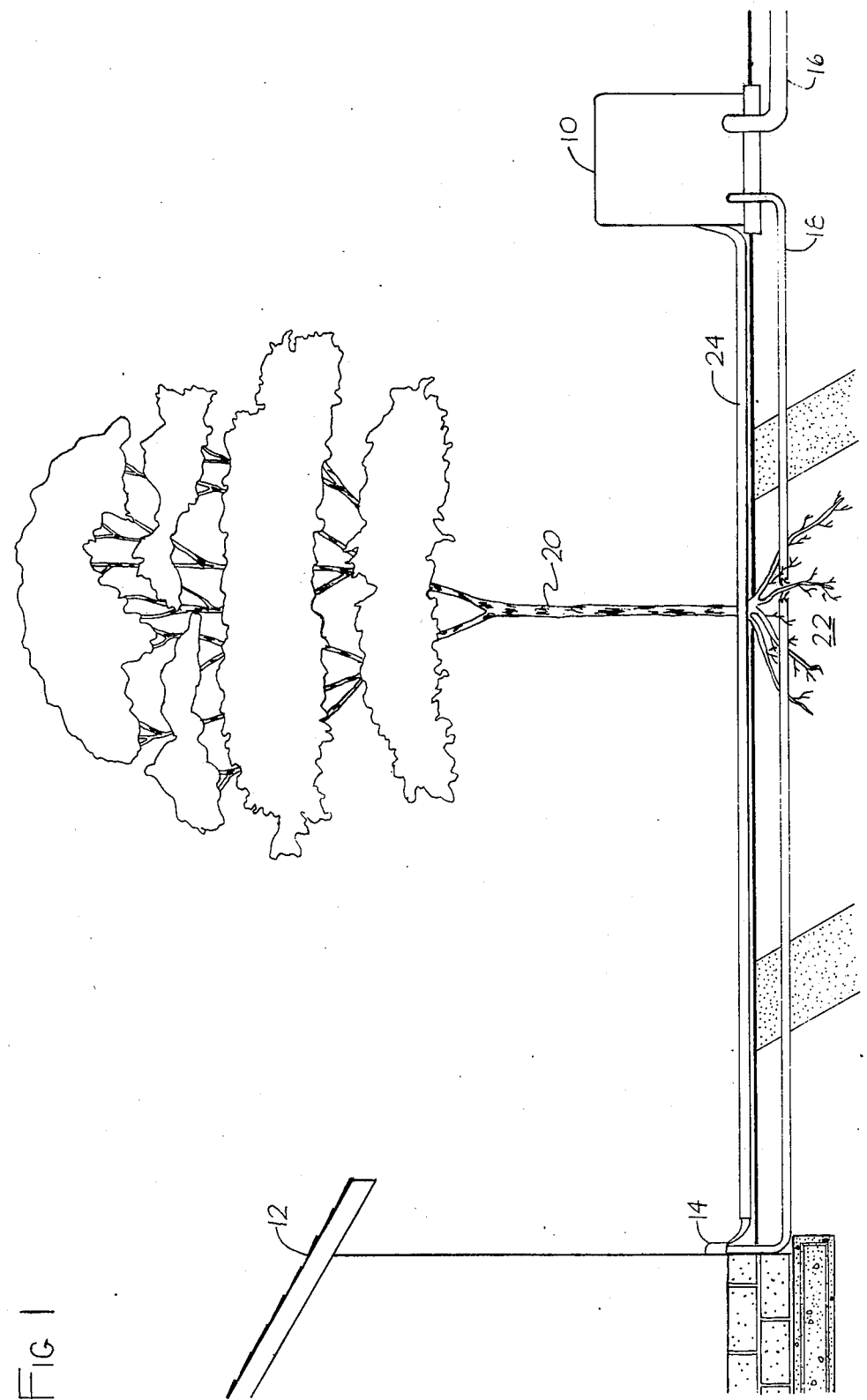
FIG. 1 is a side view illustrating, in cross-section, the method of the present invention.

The method of the present invention will now be described with reference to the drawing.

Noting FIG. 1, a typical utility terminal box 10 is shown in conjunction with a telephone subscriber's building, such as a residential home 12. The home 12 includes a telephone terminal 14 to which the telephones within the home 12 are connected.

The telephone system provides an incoming trunk 16 into the terminal box 10, and an underground cable 18 between the terminal box 10 and the terminal 14 of the subscriber's home 12, in order to provide the necessary telephone service.

For purposes of illustrating the method of the present invention, there is shown a tree 20 having roots 22 which are shown growing through the area of the underground cable 18, causing sufficient damage to the cable so as to interrupt service between the terminal box 10 and the terminal 14.

Figure 2:
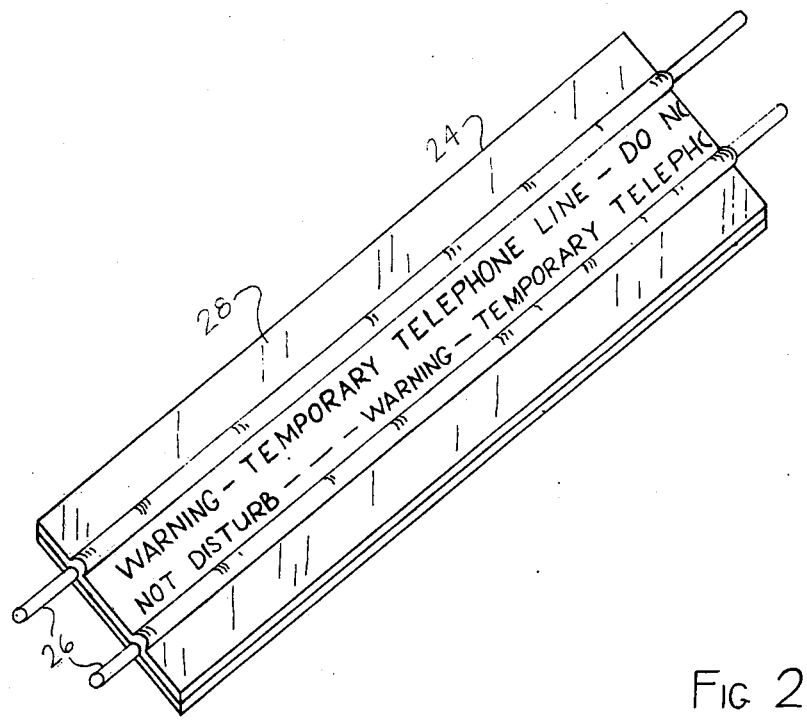
FIG. 2 is a perspective view of a flat ribbon conductor in accordance with the present invention.

Reference is now made to FIGS. 1 and 2. In accordance with the present invention, a flat, ribbon cable of an insulating material having a pair of low tensile strength conductors disposed in a flat plane within the ribbon is provided, to allow for temporary service between the terminal box 10 and the terminal 14. As noted above, typical overhead telephone conductor cable has a tensile strength of about 600 pounds. In accordance with this invention, the flat ribbon cable 24 and the two conductors 26 within the cable have a tensile strength which is at least an order of magnitude less than standard telephone cable; that is, the tensile strength of the flat ribbon 24 is substantially less than about 60 pounds. For purposes of this invention, the term "low tensile strength" is intended to mean that the tensile strength is substantially less than 60 pounds. Preferably, the tensile strength of the flat ribbon 24 and the conductors 26 is on the order of about 10 pounds, such that persons walking back and forth across the cable 24 and who might inadvertently catch a foot on the cable will not be tripped, but rather will sever the cable without causing physical injury. For these purposes copper conductor on the order of 32 gauge is suitable.

Further in accordance with the present invention, the cable 24 is provided with a printed warning along the outer surface thereof to apprise persons in the vicinity of the nature of the cable. The cable 24 likewise has a coloring on the outer surface which serves the same purpose; for example, the outer coloring of the cable 24 may be international orange or bright yellow.

Figure 3:
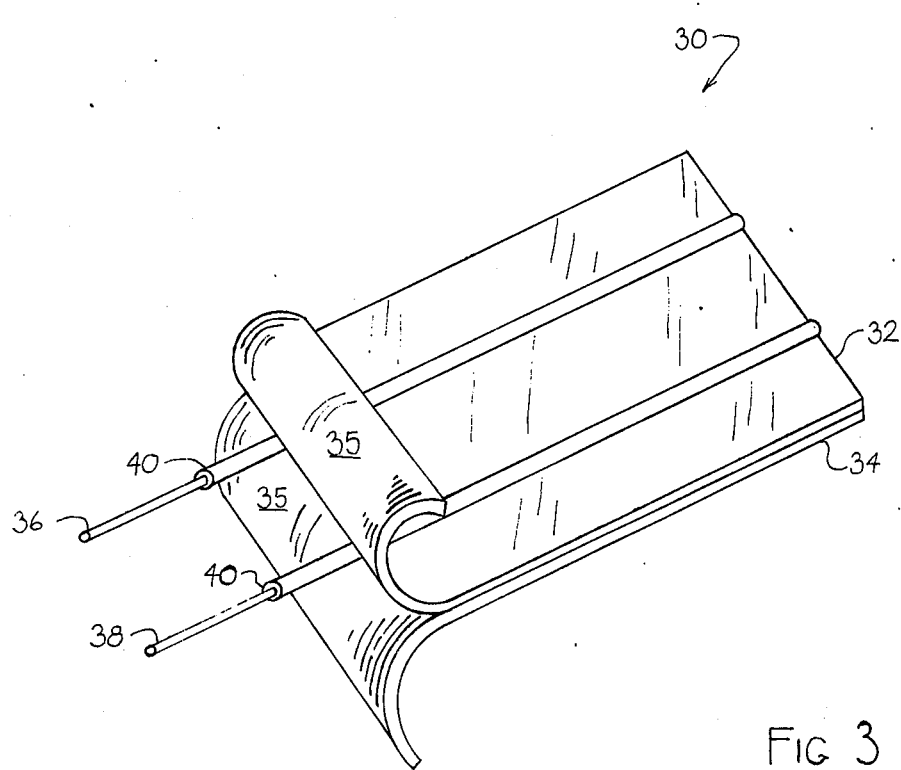
FIG. 3 is a perspective view illustrating a method of making the cable shown in FIG. 2.

A method for making the flat ribbon cable of the present invention is shown in FIG. 3, in which the cable is referred to generally as 30. The cable is formed of two flat layers of a cellulose insulating material 32 and 34, each having adhesive layer 35 on one surface thereof. The two conductors 36 and 38 likewise have a low tensile strength, for example no. 32 gauge copper wire is suitable. Preferably, the tensile strength of he conductors is no greater than that of the insulating material forming the flat ribbon. Further, the conductors 36 and 38 may have an outer layer of a sprayed insulation material 40, to provide further electrical isolation.

In use, the flat ribbon 24 or 30 may be used in the manner described above with reference to FIG. 1 to provide temporary telephone service to a subscriber served by a severed or damaged underground cable. By utilizing this method, an emergency crew may temporarily reinstate service to the subscriber's facility, allowing a plow and a further, permanent repair to be made at a later time.

The above description of the method of the present invention refers to the reinstating of telephone service interrupted by a severed underground cable. However, it will be appreciated by those skilled in the art of telephone that this method also is applicable where service is interrupted due to a severed aerial cable, or where service is first being established to a new subscriber.

I claim:

1. A method for reinstating or establishing telephone service between a telephone central office and a subscriber to be connected to said central office by a permanent cable, comprising the steps of:
   providing a low tensile strength cable having a tensile strength substantially less than 60 pounds such that such cable may be easily broken by a person inadvertently walking therethrough, said cable comprised of insulating material having a spaced pair of low tensile strength conductors therein;
   stringing said cable along the ground between said subscriber's terminal and an uninterrupted connection to the central office;
   coupling said conductors at one end of said cable to said subscriber's telephone terminal;
   coupling said conductors at the other end of said cable to said uninterrupted connections; whereby
   said low tensile strength cable provides a temporary, low injury risk, above ground conductor until repair or installation of a permanent aerial or underground cable is completed.

2. The method recited in claim 1 wherein said cable comprises a flat ribbon with said conductors lying in a common plane.

3. The method recited in claim 2 wherein said cable has a tensile strength on the order of about 10 pounds.

4. The method recited in claim 3 further comprising the step of printing a warning message across the outer surface of said ribbon.

5. The method recited in claim 4 further comprising the step of providing said ribbon with an outer warning color.

6. The method recited in claim 4 further comprising the steps of forming said ribbon by:
   providing two ribbons of an insulating material, each having an adhesive layer along one surface thereof;
   providing said two conductors; and
   disposing said two conductors between said two insulating layers; and thereafter
   pressing said two insulators together to cause the adhesive layers to bind one with the other.

7. A method for reinstating telephone service between a telephone central office and a subscriber connected to said central office by a damaged underground cable, comprising the steps of:
   providing a cable of an insulating material having a tensile strength of less than about 10 pounds, said cable further including a pair of spaced conductors therein likewise having a tensile strength of less than 10 pounds;
   stringing said cable above ground between said subscriber's telephone terminal and an uninterrupted connection to said central office;
   coupling said conductors at one end of said cable to said subscriber's telephone terminal;
   coupling said conductors at the other end of said cable to said uninterrupted connection; whereby
   said conductors are in parallel with said severed underground cable and said low tensile strength cable provides a temporary, low injury risk aboveground conductor until repair of said underground cable is completed.

* * * * *